United States Patent [19]

Brusacoram

[11] 3,760,763
[45] Sept. 25, 1973

[54] ALL TERRAIN VEHICLE

[76] Inventor: Albert V. Brusacoram, 27 N.E. 11th St., Chisholm, Minn. 55719

[22] Filed: Feb. 26, 1971

[21] Appl. No.: 119,229

[52] U.S. Cl.............................................. 115/1 R
[51] Int. Cl.............................................. B60f 3/00
[58] Field of Search........................... 115/1; 305/27

[56] References Cited
UNITED STATES PATENTS

| | | | |
|---|---|---|---|
| 3,474,751 | 10/1969 | Hebert | 115/1 |
| 3,285,676 | 11/1966 | Hetteen | 305/27 |
| 2,916,006 | 12/1959 | Crandall | 115/1 |
| 2,404,493 | 7/1946 | Hait et al. | 305/27 X |

FOREIGN PATENTS OR APPLICATIONS 609,234  11/1960  Canada................................. 305/27

Primary Examiner—Milton Buchler
Assistant Examiner—E. R. Kazenske
Attorney—Clarence A. O'Brien and Harvey B. Jacobson

[57] ABSTRACT

An amphibious vehicle of the type including opposite side endless track assemblies. The vehicle includes a main central body portion which extends longitudinally of the vehicle and defines a hollow elongated sealed flotation compartment above which the operator's position and driving motor of the vehicle may be disposed. The vehicle further includes opposite side laterally outwardly projecting and elongated generally horizontally disposed stub wing-type housings which are also sealed and define opposite side flotation compartments. The opposite side tracks of the vehicle encircle and are for the most part supported from the opposite side housings on either side of the main body portion and the endless tracks are trained about drive and idle sprocket wheels disposed at corresponding ends of the tracks spaced endwise outwardly of the corresponding ends of the opposite side housings. The combined buoyancy of the main body portion flotation compartment and the opposite side flotation compartments is sufficient to float the vehicle with an operator thereon with the water level disposed at least slightly below the upper extremities of the opposite side flotation compartments whereby the vehicle, when floating, will have resistance to rolling about its longitudinal axis.

6 Claims, 9 Drawing Figures

PATENTED SEP 25 1973   3,760,763

Albert V. Brusacoram
INVENTOR.

Attorneys

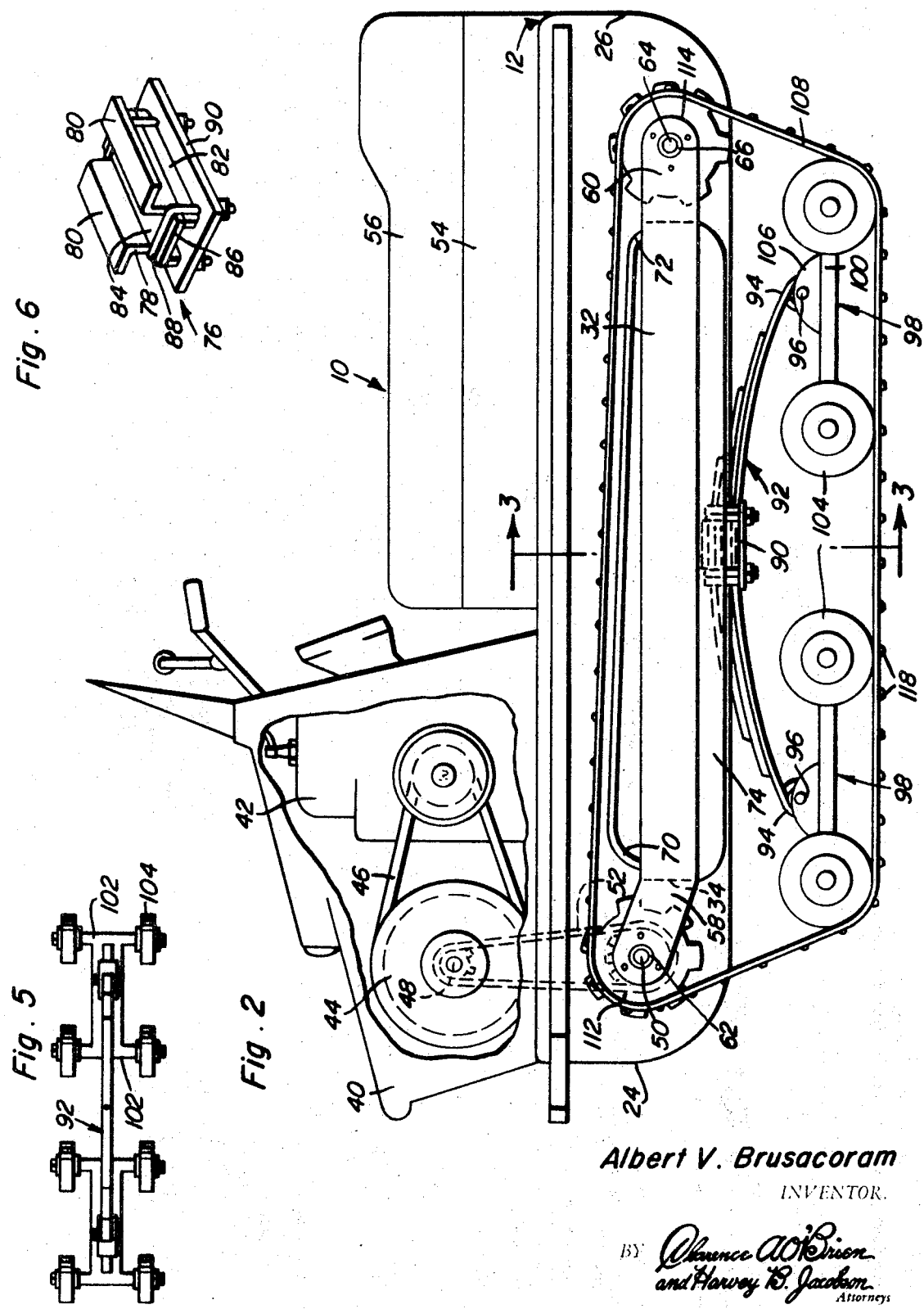

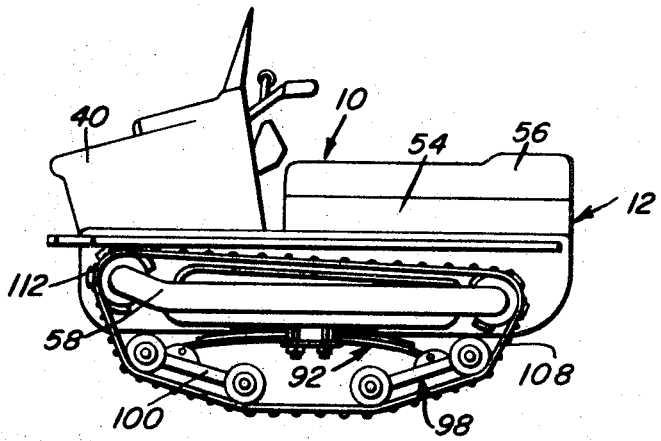
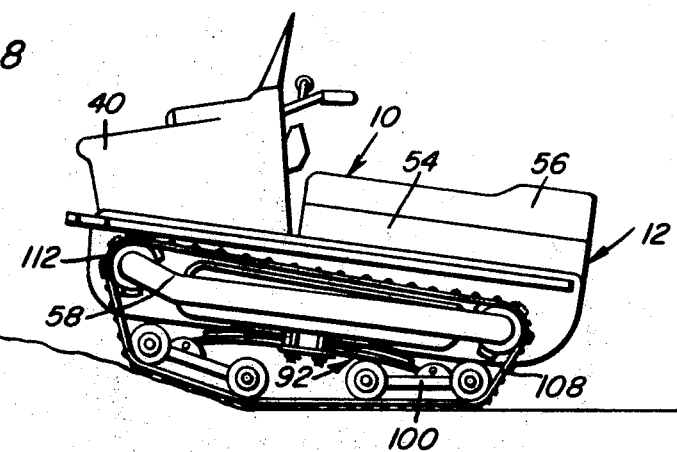
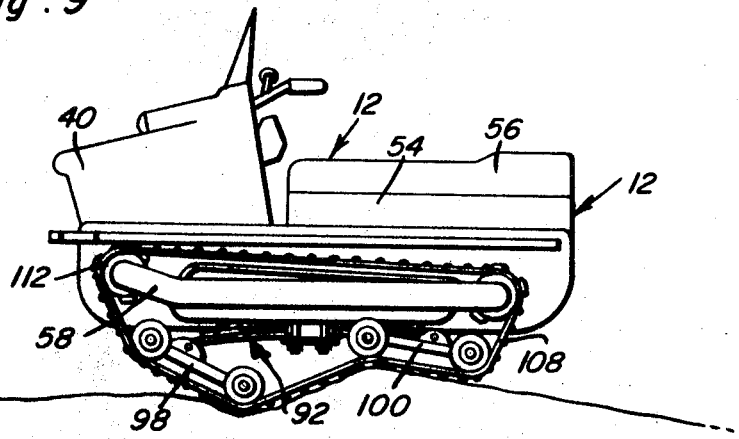

ALL TERRAIN VEHICLE

The all terrain vehicle of the instant invention has been specifically designed to provide an apparatus which may be ridden over all types of terrain and which may also be utilized to travel over the surface of a body of water. Propulsion of the vehicle while moving over the surface of a body of water is accomplished by the endless track components provided on opposite sides of the vehicle having a paddle wheel type action on the water upon which the vehicle is floated. The driving components including the endless track assemblies, the motor and the various shafts for drivingly connecting the output shaft of the motor to the drive sprockets for the endless track assemblies are all exposed exteriorly of the various flotation compartments and thus the flotation compartments are maintained air and water-tight without the utilization of complex water and airtight seals. Of course, steerage of the vehicle on water is accomplished in the same manner as when the vehicle is traveling on land in that selected endless track assemblies may be driven either forward or in reverse or braked, as desired.

The main object of this invention is to provide an all terrain vehicle that may be readily operated over various types of terrain and over the surface of a body of water as well.

Another object of this invention, in accordance with the immediately preceding object, is to provide a vehicle whose controls enable the vehicle to be steered on water in the same manner in which steering operations are accomplished on land.

Yet another object of this invention is to provide an all terrain vehicle of the amphibious type provided with center and opposite side flotation compartments disposed in relation to the driving components of the vehicle in a manner such that complex air and water-tight seals need not be utilized in connection with the drive train of the vehicle.

A final object of this invention to be specifically enumerated herein is to provide an all terrain vehicle in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is an enlarged side elevational view of the vehicle;

FIG. 5 is a top plan view of one of the spring mounted double bogie wheel assemblies of the vehicle;

FIG. 6 is a perspective view of one of the bogie wheel spring mounting brackets; and FIGS. 7 through 9 are side elevational views of the vehicle illustrating the manner in which the lower reaches of the endless track members thereof may be deflected along with the attendant bogie wheels for conforming to irregular surfaces.

Figure 1:
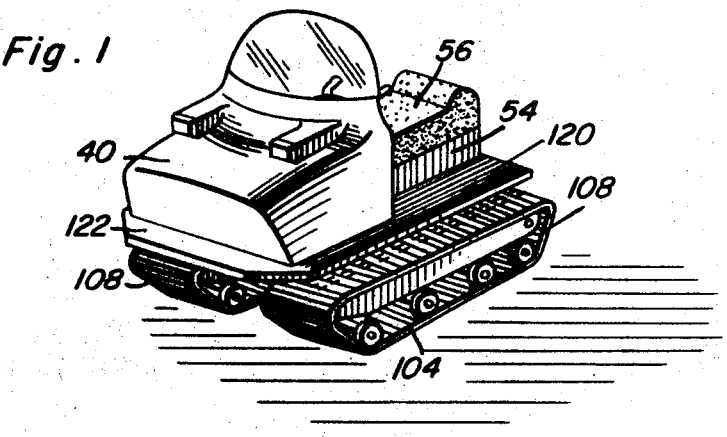
FIG. 1 is a perspective view of the all terrain vehicle.

Referring now more specifically to the drawings the numeral 10 generally designates the all terrain vehicle of the instant invention. The vehicle 10 includes a main longitudinally extending body referred to in general by the reference numeral 12 and including a lower fully enclosed and fluid tight sealed housing portion 14 defining a center buoyancy tank. The body 12 also includes a pair of opposite side longitudinally extending and generally horizontally disposed side housing portions 16 defining opposite side flotation tanks or compartments. The housing portion 14 includes top and bottom walls 18 and 20 interconnected by means of upstanding opposite side walls 22 and front and rear walls 24 and 26. The housings 16 each includes top and bottom walls 28 and 30 interconnected by an outerside wall 32 and at their opposite ends by means of front and rear walls 34 and 36. The inner sides of the housings 16 are closed by the corresponding side walls 22 of the housing portion 14 from which the top and bottom walls 28 and 30 and the end walls 34 qnd 36 are supported along their inner marginal edge portions. If desired, front and rear transverse braces 38 may be secured through the housing portion 14 in sealed relation with the side walls 22 thereof and in the housings 16.

The vehicle 10 includes a forward engine housing or shroud 40 comprising a part of the body 12 and in which an engine 42 and a clutch mechanism 44 are disposed. The engine 42 drives the clutch mechanism 44 through an endless belt 46 and the clutch mechanism drives the input shaft of a transmission (not shown) whose output shaft 48 is drivingly connected to the front opposite side driving shafts 50 of the vehicle 10 by means of endless flexible drive members 52.

The rear portion of the body 12 includes a hollow storage compartment 54 upon which a seat cushion 56 is mounted and the vehicle 10 includes suitable controls (not shown) for selectively driving and braking the opposite side endless track assemblies to be set forth more fully hereinafter driven by the drive shafts 50.

The opposite ends of the housings 16 include front and rear extensions 58 and 60 of the side walls 32 which project forward and rearward of the corresponding front and rear walls 34 and 36. The opposite side drive shafts have their outer ends rotatably received in bearing journals 62 supported from the extensions 58 and their inner ends rotatably supported in similar journals (not shown) carried by the opposing outer surface portions of the side walls 22. In addition, the outer ends of a similar pair of rear idler shafts 64 are rotatably received in bearing journals 66 supported from the extensions 60 and their inner ends are rotatably received in similar bearing journals (not shown) supported from the opposing outer surface portions of the side walls 22.

A pair of laterally spaced guide rods 68 are supported in slightly forward upwardly inclined relation above and from each of the upper walls 28 with the front and rear ends of the guide rods 68 curved downwardly and secured to the upper or top wall 28 as at 70 and 72. Also, the bottom wall 30 of each of the housings 16 includes a pair of laterally spaced longitudinally extending and downwardly projecting guard flanges 74 between whose mid-portions a pair of mounting brackets referred to in general by the reference numeral 76 are secured. Each mounting bracket includes an upwardly opening longitudinally extending channel 78 provided with upper oppositely and outwardly directed horizontal mounting flange portions 80 by which the mounting brackets 76 are secured to the undersurfaces of the bottom walls. Each of the channel members 78 includes a pair of opposite side depending retaining flanges 82, whose opposite ends project endwise outwardly of the corresponding ends 84 of the bight portion of the channel members 78 and corresponding ends of the retaining flanges 82 have a retaining bar 86 secured therebetween and are spaced slightly outwardly of the corresponding end of the channel members 78. A pair of inverted U-shaped fasteners or bolts 88 are engaged over corresponding ends of the flanges 82 between the associated bar 86 and the adjacent end of the channel member 78 and are utilized to secure a clamping plate 90 to the mounting bracket 76, the midportion of a leaf spring assembly generally referred to by the reference numeral 92 is disposed between each pair of retaining flanges 82 and clamped between the opposing surfaces of the corresponding bight portion 84 and plate 90.

The opposite ends of each of the leaf spring assemblies 92 define journals 94 through which fasteners 96 are rotatably secured in order to oscillatably fasten a pair of bogie wheel assemblies generally referred by the reference numerals 98 to the leaf spring ends. The bogie wheel assemblies 98 are identical but the rear assemblies 98 are reversed front-to-rear in relation to the front bogie wheel assemblies. Each bogie wheel assembly includes a longitudinal support beam 100 provided with opposite end transverse axle assemblies 102 on whose opposite ends bogie wheels 104 are journaled. The support beams 100 each includes mounting brackets 106 through which the corresponding fastener 96 is secured for oscillatably anchoring each support beam 100 to the corresponding leaf spring assembly end.

An endless flexible track or belt 108 including longitudinally spaced apertures 110 is trained about a toothed drive sprocket 112 mounted on the drive shaft 50 and a toothed sprocket 114 mounted on the corresponding idler shaft 64. The belt 108 is also trained beneath the bogie wheels 104. The teeth on the sprocket wheels 112 are projectable through the openings 110 in the belts and thereby establish a drive connection between the drive shafts 50 and the belts 108. Accordingly, the vehicle 10 may be propelled over the ground. Of course, the vehicle 10 may be provided with any suitable controls (not shown) for selectively driving or braking the shafts 50 whereby steerage of the vehicle 10 may be accomplished. Further, the outer surfaces of the belts 108 include transverse cleats 118 and the vehicle 10, when buoyed upon a body of water by the flotation or buoyancy tanks 14 and 16, may therefore be driven over the body of water with the cleats 118 acting as paddles.

If it is desired, the inner ends of the shafts 50 may project into the housing portion 14 in order that the endless drive members 52 drivingly coupling the transmission output shaft portions 48 to the drive shafts 50 may be enclosed within the housing portion 14. However, in this event the housing portion 14 may be constructed so as to exclude those internal portions of the housing portion 14 occupied by the inner ends of the drive shafts 50 and the lower portions of the drive members 52 from the sealed flotation compartment defined in the housing portion 14 so as to eliminate the need for fluid tight seals about the inner ends of those portions of the drive shafts 50 projecting through the side walls 22 of the housing portion 14.

With attention now invited more specifically to FIGS. 7 through 9 of the drawings, it may be seen from FIG. 7 of the drawings that when the vehicle 10 is cresting a rise and little weight of the vehicle 10 is supported from the endless track members 108, the novel bogie wheel assemblies 98 and the manner in which they are supported from the leaf spring assemblies 92 enables the endless track 108 to be maintained properly tensioned. The adjacent ends of each pair of support beams 100 swing downwardly so as to take up the slack in the endless flexible belt 108. Also, in FIG. 8 of the drawings it may be seen that the normal "power on" attitude of the vehicle 10 is in a slightly forwardly and upwardly inclined position inasmuch as the endless track members 108 are driven from the forward drive sprockets 112 and therefore that the front bogie wheel assemblies 98 are supported from less tensioned forward ends of the spring assemblies 92 than the slightly more tensioned rear end portions of the spring assemblies 92. However, with attention now invited more specifically to FIG. 9, it may be seen that the vehicle 10 is fully capable of riding smoothly over rough terrain and that the novel bogie wheel assemblies and the manner in which they are supported from the corresponding leaf spring assemblies 92 enables the endless track members 108 to readily conform to substantially any terrain irregularities with the endless track members 108 maintained in tensioned condition.

With this particular spring suspension assembly of the wheel assemblies 98, the endless tracks or belts 108 are retained in properly tensioned condition by the self-tensioning spring 92 without further adjustment thus overcoming an existent problem of the tracks or belts becoming loose.

Figure 3:
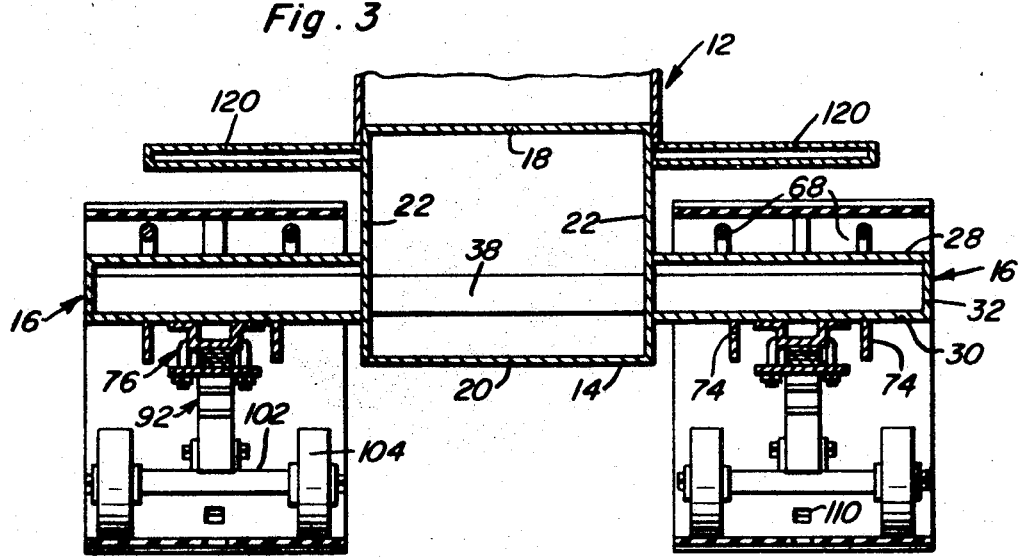
FIG. 3 is a fragmentary transverse vertical sectional view taken substantially upon the plane indicated by the section line 3—3 of FIG. 2.
Figure 4:
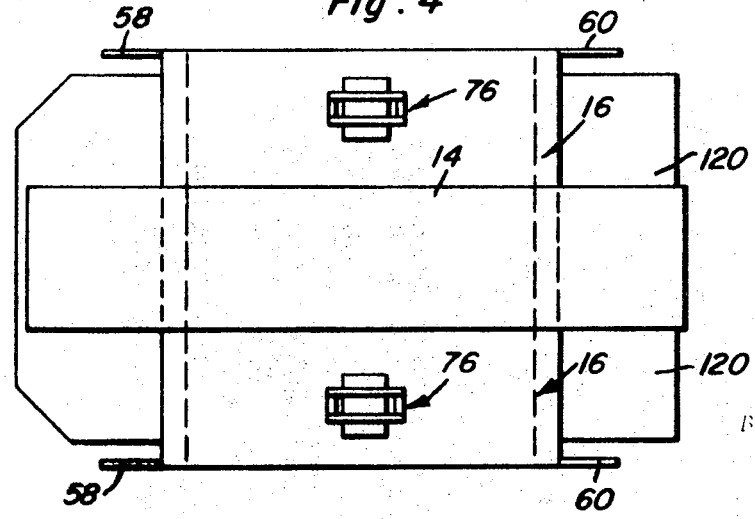
FIG. 4 is a bottom plan view of the vehicle with its drive components removed.

From FIGS. 2 and 3 of the drawings it will be noted that the opposite side portions of the body 12 include horizontally outwardly directed running board portions 120 disposed on opposite sides of the body 12 and which are spaced slightly above the upper reaches of the endless track members 108 which in turn are slightly spaced above the upper surfaces of the guide rods 68. The running boards or running board assemblies 120 are securely anchored to the opposite side walls 22 of the housing portion 14 and extend to the forward end of the vehicle 10 outwardly of the opposite sides of the shroud 40. Further, the forward ends of the running board portions 120 are interconnected by means of a forward transverse ledge 122.

It will be noted that the combined flotation afforded by the flotation tanks or compartments 14 and 16 enable the vehicle 10, with an operator aboard, to float on the surface of a body of water with the water level lying between the upper and lower walls 28 and 30 of the opposite side flotation tanks 16. In this manner, the vehicle 10 when floating, will strongly resist rolling about its longitudinal axis.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An amphibious vehicle including a central longitudinal body having a buoyant lower portion, a pair of opposite side generally horizontal and longitudinally extending buoyant bodies supported on opposite sides of said buoyant lower portion, said vehicle including drivable opposite side members supported from said opposite side bodies with the latter extending laterally of a substantial portion of the width of said members, the combined buoyancy of said buoyant lower portion and said buoyant bodies being sufficient to float said vehicle and at least an operator supported therefrom on a body of water, said opposite side bodies including front and rear endwise outwardly projecting extensions, a pair of transverse horizontal drive shafts journaled from said front extensions and a pair of transverse horizontal idle shafts journaled from said rear extensions, a drive wheel mounted on each of said drive shafts for rotation therewith and an idle wheel mounted on each of said idle shafts, said members including endless track members trained about said drive and idle wheels with the upper and lower reaches of said endless track members disposed above and below, respectively, the corresponding opposite side buoyant bodies, said opposite side buoyant bodies including generally horizontal upper wall portions extending longitudinally thereof, a pair of guide and support rods for each of said upper walls and extending longitudinally thereof in positions slightly spaced above said upper walls and spaced apart transversely of said vehicle, the opposite ends of each pair of said guide rods being curved downwardly and anchored to the corresponding upper wall, the upper surfaces of said rods being disposed for engagement by the inner surface portions of the upper reaches of said endless track members.

2. The combination of claim 1 wherein said track members include outer surface transversely extending members for operation as paddles to propel said vehicle when the latter is operated on a body of water.

3. The combination of claim 1 wherein each of said side buoyant bodies includes a single longitudinally extending, upwardly convex leaf spring assembly supported in depending relation thereto, a pair of elongated support bars extending longitudinally of the opposite ends of each leaf spring assembly for pivotal movement about horizontal transverse axes, and bogie wheels journaled from the opposite ends of each of said support bars and rollingly engaged with the inner surfaces of the lower reach of the corresponding endless track member, the point of attachment between the support bars and ends of the spring assembly being off-set toward the outer ends of the support bars, said bogie wheels being disposed below and longitudinally inwardly of the drive and idle wheels whereby the end portions of the lower reach of the track members are inclined upwardly with only the bogie wheels supporting the portion of the lower reach of the track members in engagement with the terrain with both the drive and idle wheels being continuously disposed above the terrain.

4. The combination of claim 1 wherein said buoyant lower portion of the central body and opposite side buoyant bodies being hollow and isolated from each other and completely sealed, said drive shafts and idle shafts and the drive wheels and idle wheels and track members being disposed completely exteriorly of the isolated and sealed buoyant bodies.

5. An endless track assembly for use in supporting an all terrain vehicle comprising an endless flexible track member, rotatable support members spaced longitudinally of the track member with the track member being entrained over the rotatable support members to define a longitudinally extending lower run on the track member to engage a surface being traversed, independent front and rear bogie wheel assemblies engaging the inner surface of the lower run of the track member, said bogie wheel assembies being disposed below the rotatable support members with the endmost bogie wheels on the bogie wheel assemblies being disposed longitudinally inwardly of the rotatable support members whereby the end portions of the lower run of the track member are inclined upwardly and both rotatable support members are spaced away from the supporting terrain with only the bogie wheel assemblies contacting that part of the track member in engagement with the terrain, a bowed leaf spring assembly interconnecting the bogie wheel assemblies and including an upwardly curved central portion, and means adapted to support the central portion of the leaf spring assembly from the vehicle for self-tensioning the track member and maintaining tension thereon without further adjustment, said means adapted to support the leaf spring assembly including a longitudinal support member supporting said rotatable support member, an elongated guiding and supporting rod mounted on said longitudinal support member and disposed for engagement by the inner surface portions of the upper run of the flexible track member extending between the rotatable support members, said rod having the opposite ends thereof curved downwardly to support and guide movement of the upper run of the track member.

6. The combination of claim 5 wherein each bogie wheel assembly includes a longitudinally extending support bar having at least one bogie wheel journaled at each end thereof and engaging the inner surface of the track member with the outermost bogie wheels defining that portion of the endless track member engaging the terrain, said support bars being pivotally connected to the ends of the bowed leaf spring assembly for pivotal movement about transverse axes, the point of connection between the support bars and the ends of the bowed leaf spring assembly being offset towards the outermost bogie wheels whereby the bowed leaf spring assembly will maintain tension on the endless track member and retain such tension without further adjustment and eliminate the use of a supporting assembly between the forwardmost bogie wheel and the forward rotatable support member for the endless track member.

* * * * *